United States Patent Office 2,881,158
Patented Apr. 7, 1959

2,881,158

MANUFACTURE OF BONE GLUE

Leslie M. Harkness, Chicago, Earl D. Cornwell, Downers Grove, and George P. Goetz, Chicago, Ill., assignors to Armour and Company, Chicago, Ill., a corporation of Illinois No Drawing. Application March 5, 1957
Serial No. 643,925

3 Claims. (Cl. 260—118)

This invention relates to an improved method for the production of glue from animal bones.

The oldest and simplest method of processing animal bones for glue extraction is to boil them in water in open tanks as is done in hide glue manufacture. In contrast, however, to animal hides, bones do not receive lengthy swelling treatment before extraction and being relatively hard and impervious to water penetration produce very dilute glue solutions and require lengthy processing time when extracted by open cooking. Thus, the accepted commercial procedure for the processing of bones into glue has been to subject them to higher extraction temperatures by boiling under pressure whereby the processing time is substantially reduced and the solution concentration increased.

For the pressure extraction process, bones are usually crushed to a maximum particle size of about 2 inches for increased surface contact with the cooking water, washed free of contaminants such as blood and dirt, and are charged to an autoclave or pressure tank. The bones are covered with superheated water under pressure and the collagen, or glue producing protein, is changed to glue and dissolved in the water. This treatment is repeated until the glue substance in the bones is nearly all exhausted.

With an average of 15–18% of the weight of the bones being removed as glue, a nearly equal weight of fat is recovered. The residue remaining after extraction, being rich in mineral phosphate, is dried and sold as fertilizer or as an animal feed additive.

There are many types of animal bones used in glue manufacture. In broad terms, these are divided into hard and soft varieties. Generally hard bones are crushed to increase the surface contact and water penetration during extraction, though some soft bones such as ribs are crushed to facilitate easier handling. Bones may also be classified according to their physical condition or prior processing. Green or fresh bones which comprise the largest category, are of both hard and soft variety and are obtained from both killing and cutting operations of all meat animals. These are subject to rapid deterioration and may not be stored or shipped unless under refrigeration. Packer bones are green bones which have been subjected to a short cook to remove meat fiber and all but approximately 6–8% of the grease. After drying, these bones may be stored indefinitely. Extracted dry bones are solvent-degreased bones with less than 1% retained grease. In commercial practice fresh or green bones are the ones most generally used for the production of bone glue.

Bone glue, as a general rule, has a lower test or jelly strength than hide glue and will not command the premium prices paid for the latter. As will be appreciated, this limits the utility of bone glue to those situations where strength of bond is not always an essential feature.

While the low test of bone glue is due in part to the nature of the source material, it has also been recognized that the high temperatures and pressures required for the economical extraction of glue from bones contribute to the degradation of the protein material from which the glue is derived. Thus, the necessary compromise between quality and quantity has resulted in a product having a lowered test or jelly strength.

In accordance with the present invention we have now provided a new and improved method for the production of bone glue wherein a substantial increase in the average test or jelly strength can be achieved without the necessity for making major changes or modifications of commercial equipment presently employed. Our invention can be best described and its advantages illustrated by comparison with a procedure which has been in commercial use for many years and which may be considered as generally indicative of conventional methods for the extraction of bone glue. This method involves extracting the washed bones by successively cooking at a pressure of about 23 pounds per square inch gauge with steam for about 2 hours for a series of about 10 cooks and recovering the cooking liquor. The combined liquor from all of the preceding leaching steps has an average jelly strength of about 70–85 grams. Following is a tabulation of typical results obtained employing the procedure described in detail hereinabove.

| Cook | Water | Pressure, lbs. | Time, hours |
|---|---|---|---|
| 1 | Cover bones | 23 | 2 |
| 2 | do | 23 | 2 |
| 3 | do | 23 | 2 |
| 4 | do | 23 | 2 |
| 5 | do | 23 | 2 |
| 6 | do | 23 | 2 |
| 7 | do | 23 | 2 |
| 8 | do | 23 | 2 |
| 9 | do | 23 | 3 |
| 10 | do | 23 | 3 |

| Cook | Jelly (grams)/viscosity (millipoises) | Association jelly grade |
|---|---|---|
| 1 | | |
| 2 | 162/58 | 7.4 |
| 3 | | |
| 4 | 83/44 | 4.5 |
| 5 | | |
| 6 | | |
| 7 | | |
| 8 | 34/32 | 2.4 |
| 9 | | |
| 10 | | |

Avg. jelly, 73 grams.
Yield, 14.2%.
Avg. assn. grade, 4.1.

| Cook | Jelly (grams)/viscosity (millipoises) | Association jelly grade |
|---|---|---|
| 1 | | |
| 2 | 178/69 | 8.0 |
| 3 | | |
| 4 | 81/40 | 4.4 |
| 5 | | |
| 6 | | |
| 7 | | |
| 8 | 33/30 | 2.3 |
| 9 | | |
| 10 | | |

Avg. jelly, 70.8 grams.
Yield, 14.5%.
Avg. assn. grade, 4.0.

The combined glue-containing liquor from the leaching steps in our improved process has an average jelly strength or test of from about 110 to 130 grams and higher. This represents a substantial improvement over the results obtained employing the old method. In a specific embodiment of our improved procedure, washed fresh green bones are steamed at a pressure of about 23 pounds per square inch gauge for a period of about ½ hour after which they are quenched by covering with cold water or water at room temperature without venting of the steam. In this manner the temperature of the bones is brought down to about 90 to 100° F. through the combined action of the cool water and the condensing of the steam. The bones are then allowed to leach for a period of about 1½ hours. In the second steam cycle the pressure is also about 23 pounds per square inch gauge for the same period of about ½ hour. In the second leaching cycle, however, superheated water at a temperature of about 235° F. is employed for a period of about 1½ hours. In this leaching step the steam is preferably vented before addition of the hot water. The principal advantage to be gained from leaching under pressure is an apparent improvement in the removal of grease in the bones resulting in tankage having a higher quality. The third and fourth, fifth and sixth, and seventh and eighth steaming and leaching cycles are identical with the first and second steaming and leaching cycles, respectively, as particularly described above. The ninth steaming and leaching cycles are the same as the first. In the tenth, eleventh and twelfth steaming cycles the time is increased to one hour, and in the corresponding leaching cycles superheated water at a temperature of about 235° F. is added to the bones, and the leaching effected for about 2 hours in each cycle under a steam pressure of about 23 pounds per square inch gauge.

In general, the pressure employed in any of the steaming cycles can vary between about 8 and 35 pounds per square inch gauge, but is preferably maintained at about 23 pounds per square inch. The time of the steaming cycle will vary between about 15 and 120 minutes, depending mainly upon the pressure employed. A longer time is usually required for lower pressures. For a pressure of about 23 pounds per square inch, the optimum time is about 30 minutes. In those leaching cycles when cold water is employed to quench the steamed bones, the temperature of same can vary between about 40° F. and room temperature. When hot water is employed for leaching the steamed bones the temperature thereof will be in the range between about 200 and 240° F. It will be understood that at temperatures above boiling higher pressure or superheating is employed. The time of leaching will vary between about 15 to 120 minutes.

In our improved process the leaching procedure is preferably conducted by alternating the cold water leach with hot water on every other cycle. However, other combinations of hot and cold water leaching treatments can be employed, provided however that the first leaching step is a cold water treatment without venting of the steam from the original steaming step. It has been our experience that the first leaching step is the most crucial step in the entire extraction procedure. The exact reason for this is not clearly understood but it is believed that there is a substantial reduction in the hydrolytic action typical in high pressure and high temperature exposure for long periods by virtue of the cooling effected by the cold water in combination with the condensation of the steam remaining from the cooking step.

In general, from 8 to 12 cooking and leaching treatments can be employed, preferably about 10, or until the solids content of the leaching liquor is about 1%. Beyond this the quality of the glue-containing liquor recovered from the leaching step is such as to make the operation uneconomical.

The following specific examples will help to further illustrate our invention:

EXAMPLE I 20,000 pounds of washed, fresh, green bones were put into a pressure cooking vessel and steamed at a pressure of 30 pounds per square inch gauge for a period of ½ hour. At the end of this time the valve from the steam line was closed and, without venting, water at a temperature of about 40° F. was run into the vessel until the bones were slightly more than covered with the water. The bones were then allowed to leach for a period of 1½ hours and the glue-containing liquor was recovered. This procedure was repeated three times except that the pressure on the steaming cycle was reduced to about 23 pounds per square inch gauge. In the fifth treatment the bones were steamed at 23 pounds per square inch gauge for a period of about 20 minutes after which the steam line was closed and the pressure released. Superheated water at a temperature of about 235° F. was then run into the vessel until the bones were covered with it and leaching was allowed to take place for a period of about 1½ hours. This same procedure was then repeated four more times. The results of the foregoing treatment are tabulated in Table I, as follows:

Table I

| Waters | Percent solids | Jelly (grams)/ viscosity (millipoises) | Glue assn. jelly grade |
|---|---|---|---|
| 1 | 4.6 | 207/75 | 9.0 |
| 2 | 3.6 | 166/73 | 7.6 |
| 3 | 5.6 | 170/70 | 7.7 |
| 4 | 4.2 | 132/60 | 6.4 |
| 5 | 4.5 | 126/60 | 6.2 |
| 6 | 2.7 | 83/49 | 4.5 |
| 7 | 2.9 | 80/49 | 4.4 |
| 8 | 2.7 | 65/43 | 3.8 |
| 9 | 2.9 | 56/38 | 3.4 |
| 10 | 2.1 | 38/29 | 2.6 |

10 water total yield, 13.6%.
Average jelly strength, 131 grams.
Average assn. grade, 6.4.

EXAMPLE II

In six separate plant runs 20,000 pounds each of washed, fresh, green bones were put into a pressure cooking vessel and steamed at a pressure of 23 pounds per square inch gauge for a period of 30 minutes. At the end of this time the valve from the steam line was closed and without venting, water at a temperature of about 45° F. was run into the vessel until the bones were slightly more than covered with the water. The bones were then allowed to leach for a period of 90 minutes and the glue-containing liquor was recovered. In the second steaming cycle the bones were again steamed at a pressure of 23 pounds per square inch gauge for 30 minutes. At the end of this steaming cycle the steam pressure was vented and superheated water at a temperature of about 235° F. was run into the vessel until the bones were slightly more than covered. The bones were allowed to leach for a period of about 90 minutes and the glue-containing liquor was recovered. The third, fifth, seventh and ninth steaming and leaching cycles were identical with the first steaming and leaching cycles. The fourth, sixth and eighth steaming and leaching cycles were identical with the second steaming and leaching cycles. In the tenth, eleventh and twelfth steaming cycles the time of steaming was increased to 60 minutes, and in the corresponding leaching cycles superheated water at a temperature of about 235° F. was added to the bones and the leaching effected for about 2 hours (in each cycle) under a steam pressure of about 23 pounds per square inch gauge. The results of the foregoing tests are tabulated in Table II following:

Table II

| Waters | Steam, lbs. | Time, hours | Type water | Leaching time, hours |
|---|---|---|---|---|
| 1 | 23 | ½ | Cold | 1½ |
| 2 | 23 | ½ | Hot | 1½ |
| 3 | 23 | ½ | Cold | 1½ |
| 4 | 23 | ½ | Hot | 1½ |
| 5 | 23 | ½ | Cold | 1½ |
| 6 | 23 | ½ | Hot | 1½ |
| 7 | 23 | ½ | Cold | 1½ |
| 8 | 23 | ½ | Hot | 1½ |
| 9 | 23 | ½ | Cold | 1½ |
| 10 | 23 | 1 | Hot | 2 |
| 11 | 23 | 1 | ...do | 2 |
| 12 | 23 | 1 | ...do | 2 |

| Waters | Jelly (grams)/ viscosity (millipoises) | Association jelly grade |
|---|---|---|
| 1 | 156/59 | 7.2 |
| 2 | 171/64 | 7.7 |
| 3 | 163/58 | 7.4 |
| 4 | | |
| 5 | 103/48 | 5.3 |
| 6 | | |
| 7 | | |
| 8 | | |
| 9 | 52/34 | 3.2 |
| 10 | | |
| 11 | | |
| 12 | | |

Avg. jelly, 117 grams
Yield, 18.1%.
Avg. assn. jelly grade, 5.8.

| Waters | Jelly (grams)/ viscosity (millipoises) | Association jelly grade |
|---|---|---|
| 1 | 190/62 | 8.4 |
| 2 | 185/58 | 8.2 |
| 3 | 150/54 | 7.0 |
| 4 | | |
| 5 | 81/40 | 4.4 |
| 6 | | |
| 7 | | |
| 8 | | |
| 9 | 58/34 | 3.5 |
| 10 | | |
| 11 | | |
| 12 | | |

Avg. jelly, 113 grams.
Yield, 15.8%.
Avg. assn. jelly grade, 5.9.

| Waters | Jelly (grams)/ viscosity (millipoises) | Association jelly grade |
|---|---|---|
| 1 | 201/86 | 8.0 |
| 2 | 188/73 | 8.3 |
| 3 | 156/65 | 7.2 |
| 4 | | |
| 5 | 132/57 | 6.4 |
| 6 | | |
| 7 | | |
| 8 | | |
| 9 | 68/39 | 3.9 |
| 10 | | |
| 11 | | |
| 12 | | |

Avg. jelly, 141 grams.
Yield, 16.2%.
Avg. assn. jelly grade, 6.7.

| Waters | Jelly (grams)/ viscosity (millipoises) | Association jelly grade |
|---|---|---|
| 1 | 231/69 | 9.8 |
| 2 | | |
| 3 | 165/56 | 7.5 |
| 4 | | |
| 5 | 144/52 | 6.8 |
| 6 | | |
| 7 | | |
| 8 | 47/30 | 3.0 |
| 9 | | |
| 10 | | |

Avg. jelly, 131 grams.
Yield, 16.9%.
Avg. assn. jelly grade, 6.3.

| Waters | Jelly (grams)/ viscosity (millipoises) | Association jelly grade |
|---|---|---|
| 1 | 228/70 | 9.7 |
| 2 | | |
| 3 | 198/63 | 8.7 |
| 4 | | |
| 5 | 160/58 | 7.3 |
| 6 | | |
| 7 | | |
| 8 | | |
| 9 | 92/42 | 4.9 |
| 10 | | |
| 11 | | |
| 12 | | |

Avg. jelly, 163 grams.
Yield, 15.1%.
Avg. assn. jelly grade, 7.4.

| Waters | Jelly (grams)/ viscosity (millipoises) | Association jelly grade |
|---|---|---|
| 1 | 180/68 | 8.0 |
| 2 | | |
| 3 | | |
| 4 | 120/55 | 5.9 |
| 5 | | |
| 6 | | |
| 7 | | |
| 8 | | |
| 9 | 60/39 | 3.5 |
| 10 | | |
| 11 | | |
| 12 | | |

Avg. jelly, 114 grams.
Yield, 14.9.
Avg. assn. jelly grade, 5.7.

While this invention has been described and exemplified in terms of its preferred modification, those skilled in the art will appreciate that modifications can be made without departing from the spirit and scope of this invention.

We claim:

1. An improved method for the extraction of glue from bones comprising subjecting washed bones to a first treatment including the steps of steaming said bones at a pressure of from 8 to 35 pounds per square inch gauge for a period of from 15 to 120 minutes; at the end of said period and without releasing said pressure quenching said bones by covering the same with cold water at at a temperature from about 40° F. to about room temperature to reduce the temperature to about 85 to 120° F.; leaching said bones with the cool water for a period of about 15 to 120 minutes, and recovering the glue-containing liquor; subjecting said bones to a second treatment including the steps of steaming said bones at a pressure of from 8 to 35 pounds per square inch gauge for a period of 15 to 120 minutes; releasing said steam pressure and covering said bones with hot water at a temperature of from 200 to 240° F.; leaching said bones with said hot water for a period of about 15 to 120 minutes, and recovering the glue-containing liquor; and continuing the preceding treatments of said bones in a generally alternating plan until the solids content of the glue-containing liquor recovered reaches about 1%.

2. An improved method for the extraction of glue from bones comprising subjecting washed bones to a cyclic procedure in which the first cycle includes the steps of steaming said bones at a pressure of about 30 pounds per square inch gauge for a period of 30 minutes; quenching said bones at the end of said period without releasing the pressure by covering with cold water at a temperature from about 40° F. to about room temperature to reduce the temperature to between 85 and 120° F.; leaching said bones with said water for a period of about 90 minutes, and recovering the glue-containing liquor; repeating said first cycle an additional three times at a reduced steaming pressure of about 23 pounds per square inch gauge; on the fifth cycle subjecting the bones to a treatment including the steps of steaming at a pressure of about 23 pounds per square inch gauge for a period of about 20 minutes; releasing said steam pressure and covering said bones with superheated water at a temperature of about 235° F.; leaching said bones with said hot water for a period of about 90 minutes, and recovering the glue-containing liquor; and repeating said fifth cycle of steps an additional four times.

3. An improved method for the extraction of glue from bones comprising subjecting washed bones to a series of alternating cyclic treatments in which the first treatment comprises steaming the washed bones at a pressure of about 23 pounds per square inch gauge for a period of about 30 minutes; quenching said bones at the end of said period and without releasing the pressure by covering the same with cold water at a temperature from about 40° F. to about room temperature to reduce the temperature thereof to about 85 to 120° F.; leaching said bones with said cold water for a period of about 90 minutes; and recovering the glue-containing liquor; subjecting the bones to a second treatment including the steps of steaming said bones at a pressure of about 23 pounds per square inch gauge for a period of about 30 minutes; releasing said steam pressure at the end of said period, covering the bones with superheated water at a temperature of about 235° F.; leaching said bones with said hot water for a period of about 90 minutes, and recovering the glue-containing liquor; repeating said first treatment at a steaming pressure of about 23 pounds per square inch gauge and thereafter alternating between the second and third treatments until the bones have been subjected to a total of 12 treatments.

References Cited in the file of this patent

UNITED STATES PATENTS

| | | |
|---|---|---|
| 1,086,149 | Low | Feb. 3, 1914 |
| 1,470,228 | Lister | Oct. 9, 1923 |
| 1,904,003 | Kohl | Apr. 18, 1933 |
| 2,517,487 | Hill et al. | Aug. 1, 1950 |